(12) United States Patent
Lee et al.

(10) Patent No.: US 10,436,581 B2
(45) Date of Patent: Oct. 8, 2019

(54) RANGING APPARATUS (71) Applicant: STMicroelectronics (Research & Development) Limited, Marlow, Buckinghamshire (GB)

(72) Inventors: Sam Lee, Edinburgh (GB); John Kevin Moore, Edinburgh (GB); Francescopaolo Mattioli Della Rocca, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 361 days.

(21) Appl. No.: 15/168,456

(22) Filed: May 31, 2016

(65) Prior Publication Data
US 2017/0176184 A1    Jun. 22, 2017

(30) Foreign Application Priority Data

Dec. 18, 2015  (EP) .................................. 15201232

(51) Int. Cl.
| *G01C 3/02* | (2006.01) |
| *G01S 17/10* | (2006.01) |
| *G01S 7/481* | (2006.01) |
| *G01S 7/487* | (2006.01) |
| *G01S 7/499* | (2006.01) |

(52) U.S. Cl.
CPC ............... *G01C 3/02* (2013.01); *G01S 7/487* (2013.01); *G01S 7/4816* (2013.01); *G01S 7/499* (2013.01); *G01S 17/10* (2013.01)

(58) Field of Classification Search
CPC ...................................................... G01C 3/08
See application file for complete search history.

(56) References Cited

U.S. PATENT DOCUMENTS

| 3,669,540 | A | * | 6/1972 | Rattman et al. ........ G01S 7/499 |
| | | | | 340/850 |
| 6,987,256 | B2 | * | 1/2006 | English ..................... G01J 4/00 |
| | | | | 250/203.6 |
| 2006/0071846 | A1 | | 4/2006 | Yanagisawa et al. |
| 2011/0181881 | A1 | | 7/2011 | Mathur et al. |
| 2012/0162632 | A1 | * | 6/2012 | Dutton .................... G01S 7/486 |
| | | | | 356/5.01 |
| 2013/0003037 | A1 | * | 1/2013 | Nau ....................... G01S 17/875 |
| | | | | 356/3.01 |

(Continued)

FOREIGN PATENT DOCUMENTS

| CN | 103411630 A | 11/2013 |
| GB | 2301967 A | 12/1996 |
| WO | WO-2011029645 A1 | 3/2011 |

OTHER PUBLICATIONS

EPO Search Report and Written Opinion for EP 15201232.4 dated Jun. 28, 2016 (10 pages).

(Continued)

*Primary Examiner* — Luke D Ratcliffe
(74) *Attorney, Agent, or Firm* — Crowe & Dunlevy (57) ABSTRACT

A distance sensing apparatus includes a light source configured to emit polarized light. A light sensitive detector detects light emitted by said light source and reflected from a target. The light sensitive detector is configured to substantially prevent polarized light reflected from a target with a relatively high reflectance from being detected.

11 Claims, 10 Drawing Sheets

(56) References Cited

U.S. PATENT DOCUMENTS

2015/0219813 A1* 8/2015 Blacker ............... G02B 5/3058
  351/159.56

OTHER PUBLICATIONS

Anonymous: "Polarizer—Wikipedia, the free encyclopedia", Nov. 6, 2015, XP55272128. Retrieved from the Internet: URL:https://web.archive.org/web/20151106062934/http://e.wikipedia.org.wiki/Polarizer. retrieved onMay 12, 2016 paragraph01.1 (10 pages).
2d Office Action for co-pending CN Appl. No. 201610245414.X dated Aug. 5, 2019 (8 pages).

* cited by examiner

RANGING APPARATUS

PRIORITY CLAIM

This application claims priority from European Patent Application No. 15201232.4 filed Dec. 18, 2015, the disclosure of which is incorporated by reference.

TECHNICAL FIELD

Some embodiments relate to an apparatus and in particular but not exclusively to an apparatus for use in ranging applications.

BACKGROUND

Devices for determining the distance to objects are known. One currently used method is called "Time of Flight". This method comprises sending a light signal towards the object and determining the time taken by the signal to travel to the object and back. The calculation of the time taken by the signal for this travel may be obtained by measuring the phase shift between the signal coming out of the light source and the signal reflected on the object and detected by a light sensor. Knowing this phase shift and the speed of light enables the determination of the distance to the object. Other techniques using histogram techniques are also known.

Single photon avalanche diodes (SPAD) may be used to sense the reflected light. In general an array of SPADs are provided as a sensor in order to detect a reflected light pulse. A photon may trigger an avalanche current in one or more of the SPADs in an SPAD array. The avalanche current may signal an event, namely that a photon of light has been detected.

SUMMARY

According to an aspect, there is provided a distance sensing apparatus comprising: light source arrangement configured to emit polarized light; and a light sensitive detector arrangement configured to detect light emitted by said light source and reflected from a target, wherein said light sensitive detector arrangement is configured to substantially prevent said polarized light reflected from a target with a relatively high reflectance from reaching said detector.

The light source arrangement may comprise an emitter of polarized light.

The light source arrangement may comprise a light source and a light source polarizing arrangement.

The light source polarizing arrangement may be configured to function for one of: circularly polarizing said light emitted by said light source; and linearly polarizing said light emitted by said light source.

The light sensitive detecting arrangement may comprise a detector polarizing arrangement and at least one light sensitive detector.

The detector polarizing arrangement may provide said light source polarizing arrangement.

At least one of said light source polarizing arrangement and said detector polarizing arrangement may comprise a quarter wave plate.

At least one of said light source polarizing arrangement and said detector polarizing arrangement may comprise a linear polarizer.

The detector polarizing arrangement may comprises at least one first linear polarizer and at least one second linear polarizer orthogonal to the at least one first linear polarizer.

The target with a relatively high reflectance may comprise glass, a mirror or a mirrored surface.

The light sensitive detector arrangement may comprise a least one light sensitive detector, at least one of said light sensitive detectors comprising a linear grid, providing a linear polarizer.

The linear grid may comprise a grid of parallel wires, the longitudinal extent of said wires defining a plane of polarization.

The spacing between adjacent wires may be less than a wavelength of light.

The or each grid may be individually provided to a respective photosensitive detector.

The light sensitive detector may comprise an array of light sensitive detectors, at least one of which is provided with a polarizing filter and at least one of which is without a polarizing filter.

The or each light sensitive detector may comprise a SPAD.

BRIEF DESCRIPTION OF THE DRAWINGS

Some embodiments will now be described by way of example only and with reference to the accompanying Figures in which.

DETAILED DESCRIPTION

Figure 1:
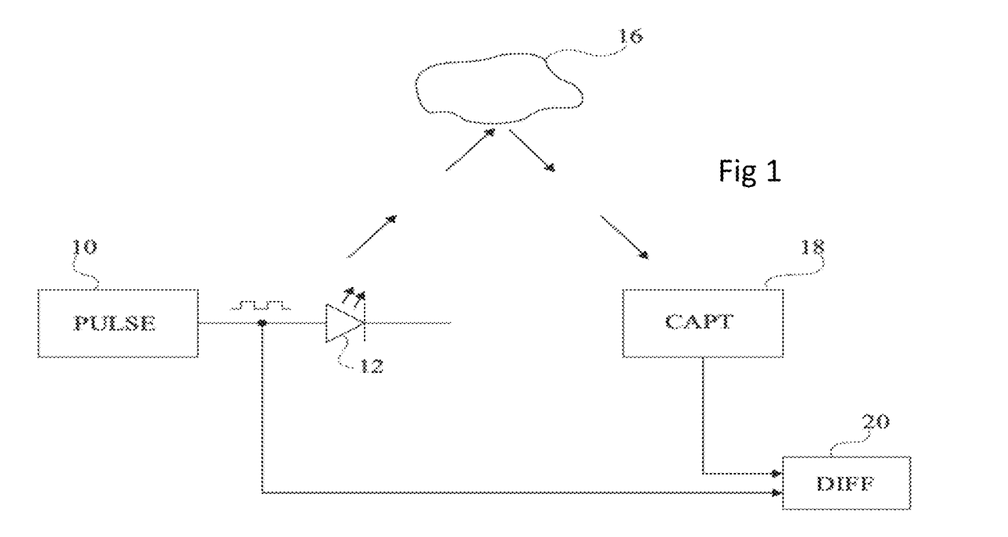
FIG. 1 illustrates principle of the "time of flight" method for determining the distance to an object.

In FIG. 1, a generator 10 (PULSE) provides a periodic electric signal, for example, said signal may be square-wave shaped. This signal powers a light source 12. An example of the light source 12 may be a light-emitting diode, or any known lighting device, for example, a laser. The signal coming out of light source 12 is transmitted towards an object 16 and is reflected by this object. The reflected light signal is detected by a light sensor 18 (CAPT). The signal at the sensor 18 (CAPT) is thus delayed from the signal provided by the generator by a time period proportional to twice the distance to the object 16.

Calculation block 20 (DIFF) receives the signals generated by generator 10 and by sensor 18 and functions to obtain the distance to object 16. Various different techniques are known for determining this distance.

Figures 2A, 2B:
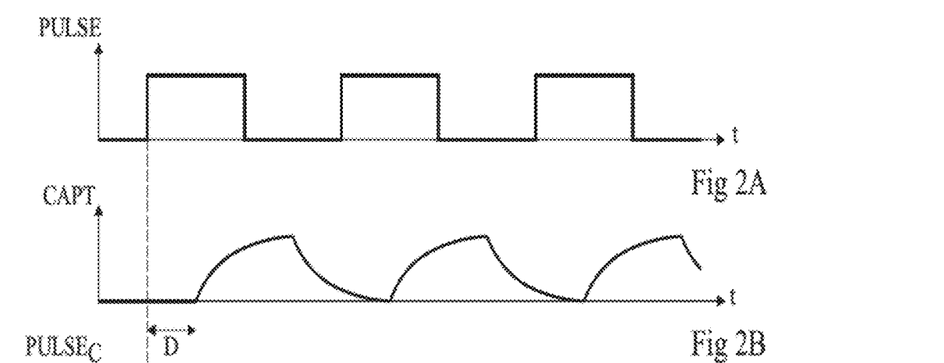
FIGS. 2A to 2C are timing diagrams illustrating results obtained by means of the device of FIG. 1, as well the operation of "SPADs"
Figure 2C:
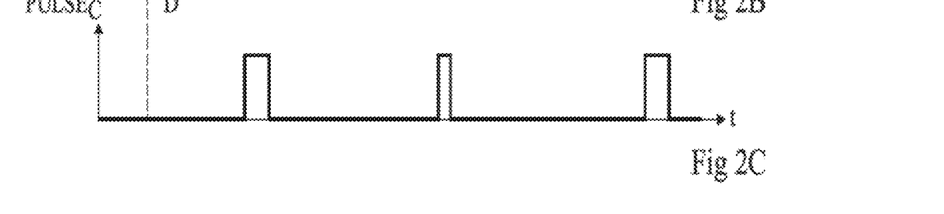

FIGS. 2A to 2C are timing diagrams illustrating the operation of a circuit such as that in FIG. 1. FIG. 2A illustrates a periodic signal PULSE provided by the generator 10 of FIG. 1. FIG. 2B illustrates the signal received by sensor 18 (CAPT). The signal on sensor 18 is delayed by a delay D from the signal coming out of generator 10.

Usually, sensor 18 integrates one or several photo detection elements enabling the detection of the signal received after reflection from the object 16. Such elements may be rapid charge transfer photodiodes. Single-photon avalanche diodes, or "SPADs", also called Geiger mode avalanche photodiodes, may alternatively be used. These devices have a reverse biased p-n junction in which a photon can trigger an avalanche current due to an impact ionization mechanism. SPADs may be designed to operate with a reverse bias voltage well above the breakdown voltage.

FIG. 2C illustrates the signal (PULSEC) generated by sensor 18, in the case where this sensor contains such a SPAD.

SPADs operate as follows. At an initial time, the diode is reverse-biased to a voltage larger than its breakdown voltage. The reception of a photon in the diode junction area starts an avalanche current in the diode, which creates an electric pulse. The diode is then biased back to a voltage smaller than the breakdown voltage to quench the avalanche current, so that the SPAD may again react to the reception of a photon. However, the diode must again be reverse-biased to a voltage larger than its breakdown voltage in order to react to another photon. SPADs can currently be used in cycles having reactivation periods shorter than 10 ns. Thereby, SPADs can be used at high frequency to detect objects at relatively short distances from the measurement device, for example, distances ranging from a few centimeters to a few tens of centimeters. Other arrangements may support different ranges.

As illustrated in FIG. 2C, if SPADs receive a light signal such as described in relation to FIG. 2B, the diode avalanche time may vary with respect to this signal. The graph of the number of pulses versus time reflects the power-time profile of the light received by the SPAD. Thus, in the case illustrated in FIGS. 2A to 2C, on a large number of acquisitions, the graph of the pulse transmission by the SPAD substantially follows the curve of FIG. 2B.

Thus, a time of flight (ToF) sensor can measure the distance between the sensor and a target surface by determining the time it takes for light emitted to be reflected back to the sensor.

The measurements from the ToF sensor may have many different applications. For example the measurements may be used to assist the auto-focus mechanism when taking a photograph. The ToF sensor may be provided in a camera and information about the distance to an object is used to at least partially control a focusing mechanism in the camera.

A problem however arises when the user wants to take a picture of a mirror or through an external glass window. Under such use cases, it may be desirable for the ToF sensor to return the range of the object "in" the mirror or behind the glass. However because the signal returned from the glass and mirror surface is generally relatively high compared to the reflections from the object of interest, the ToF sensor tends to return the range of the mirror or glass (i.e. the distance to the mirror or glass surface) instead of the object of interest.

Figure 3:
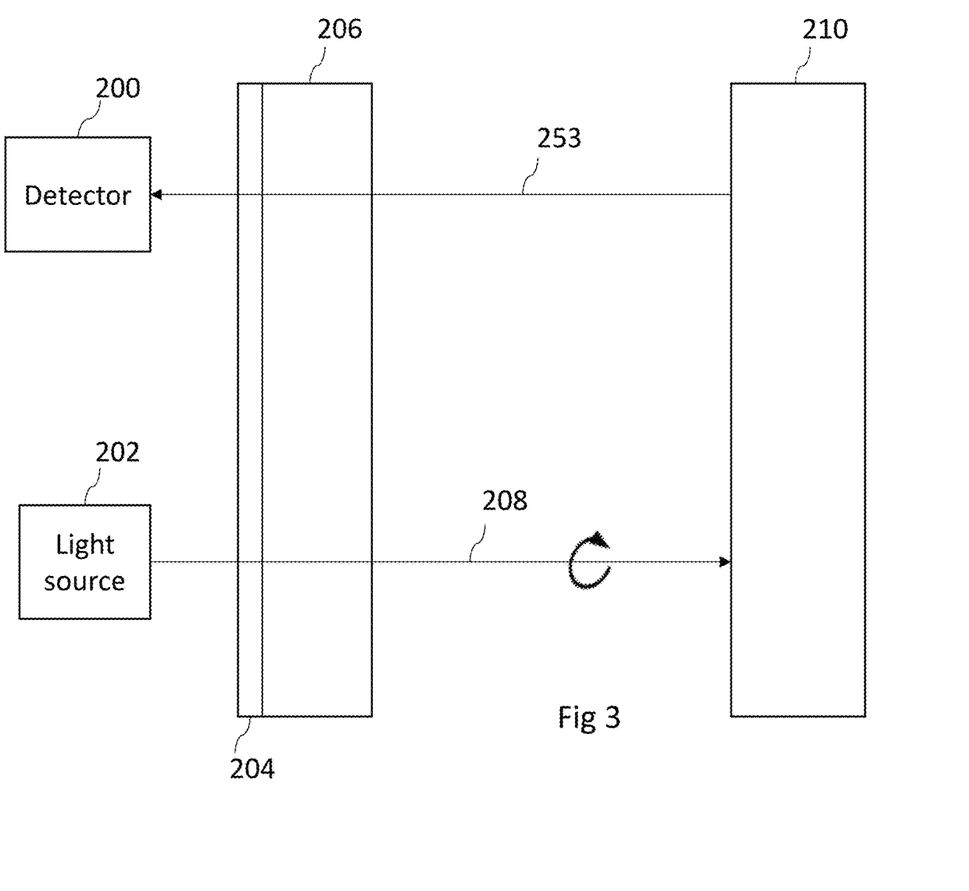
FIG. 3 shows a scenario where light is reflected from a non-reflective object.

Reference is made to FIG. 3 where the object 210 is not reflective. Light from a light source to 202 is emitted and passes through a first linear polarizer 204. The linear polarizer 204 will cause the unpolarized light emitted by the light source 202 to be linearly polarized. The linearly polarized light is then passed through a quarter wave plate 206 to produce circularly polarized light 208. When the light is reflected off the object 210, the reflected light 253 is not polarized. The reflected light 253 passes largely unimpeded through the quarter wave plate 206 and the linear polarizer 204 although the latter will linearly polarize the light. Accordingly, the reflected light will reach the detector 200.

Figure 4:
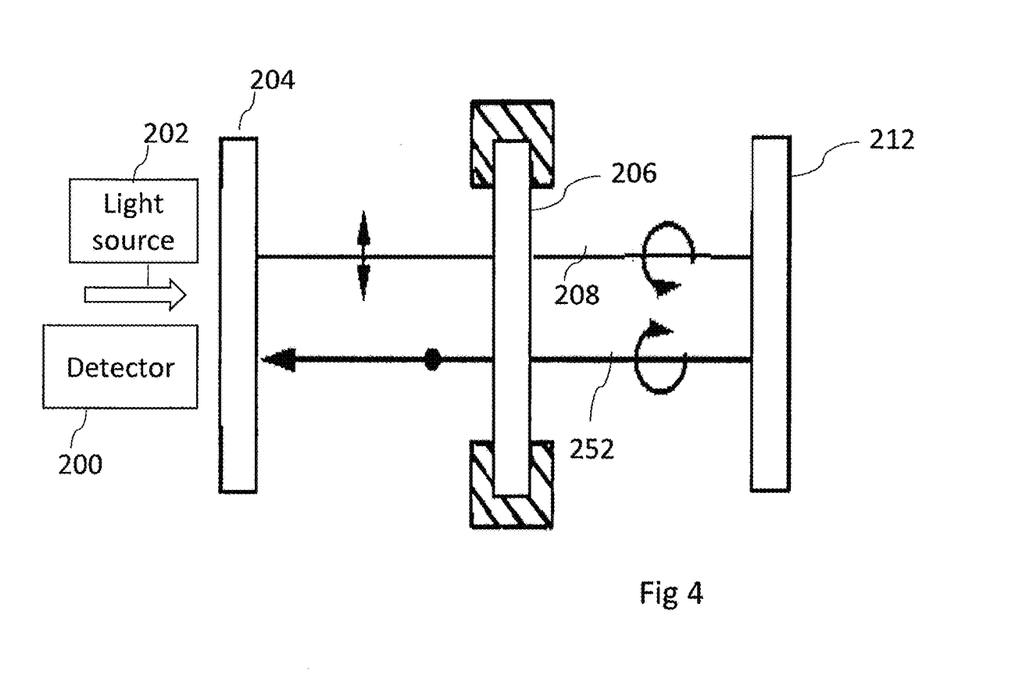
FIG. 4 shows principles used in some embodiments.

Reference is made to FIG. 4 which shows the principles used in some embodiments. Light from a light source to 202 is emitted and passes through a first linear polarizer 204. The linear polarizer 204 will cause the unpolarized light emitted by the light source 202 to be linearly polarized (P-polarization in the example shown). The linearly polarized light is then passed through a quarter wave plate 206. The quarter wave plate 206 produces circularly polarized light 208. When the light is reflected off a reflective surface 212, the reflected light 208 is circularly polarized but has a reverse polarized state as compared to the incident light. The reflective surface for example, may be glass, a mirror or any other type of reflective surface. The reflected light 252 passes through the quarter wave plate 206 where it is converted to linearly polarized light. However, this linearly polarized light is orthogonal to the polarization introduced by the linear polarizer 204 (S-polarization in the example shown). Accordingly, the reflected light is blocked by the linear polarizer 204. Thus, the reflected light does not reach the detector 200.

As will be discussed in more detail, the reflective surface 212 may be a mirror, a pane of glass of a window or any other suitable reflective surface. As the light which is reflected from the reflective surface does not reach the detector, this means that the detector would not detect the reflective surface as a target.

Figure 5:
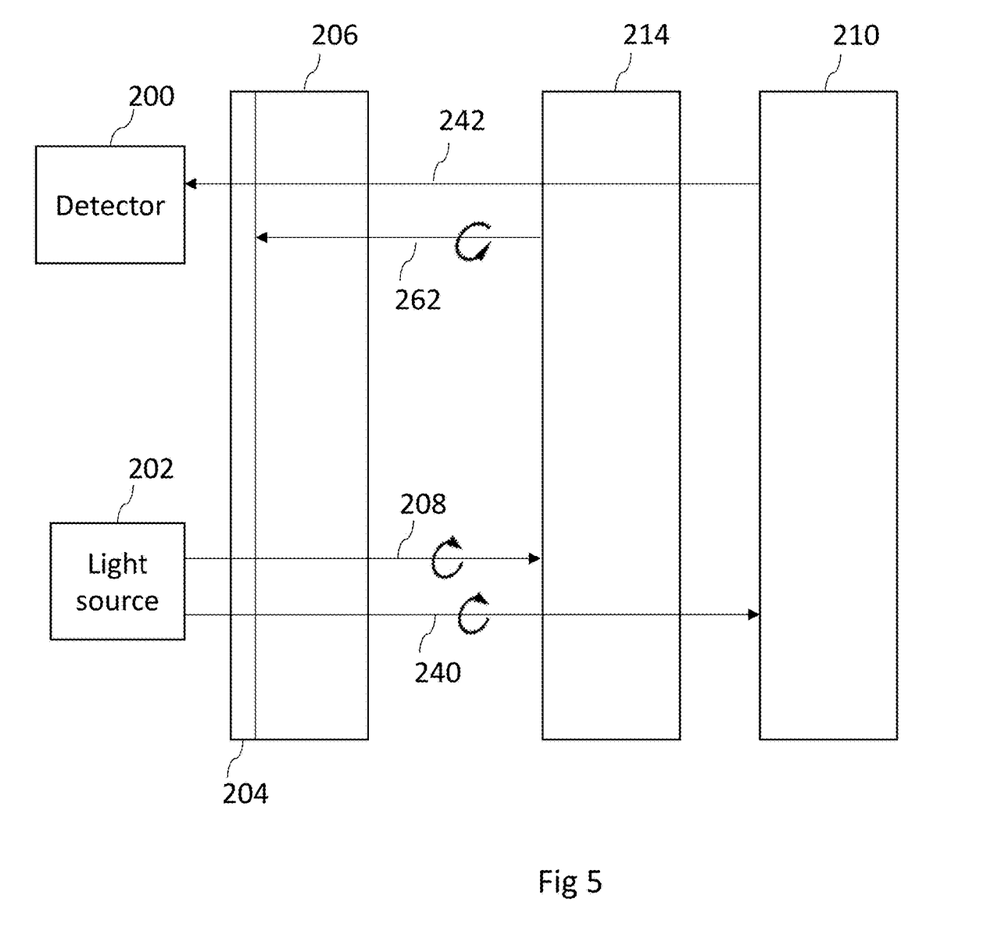
FIG. 5 shows a scenario where light is reflected from a window.

Reference is made to FIG. 5 which shows where the reflective surface a pane of glass 214 of a window and the object 210 is behind the window. Light from the light source 202 passes through the linear polarizer 204 and the quarter wave plate 206. The light is thereby circularly polarized as previously discussed. The light which is reflected from the glass is referenced 262. As previously discussed, light which is reflected is circularly polarized but has a reverse polarized state as compared to the incident light. The reflected light 262 passes through the quarter wave plate 206 where it is converted to linearly polarized light and then blocked by the linear polarizer 204. Thus, the reflected light from the glass does not reach the detector 200.

However, some light from the light source 202 will pass through the glass 214 and be reflected back from object 210. The light 242 which is reflected by object 210 is unpolarized. The unpolarized light 242 reflected from object 210 passes through the pane of glass 214, the quarter wave plate 206 and the linear polarizer 204 as discussed in relation to FIG. 3 to be thereby detected by the detector 200.

Figure 6:
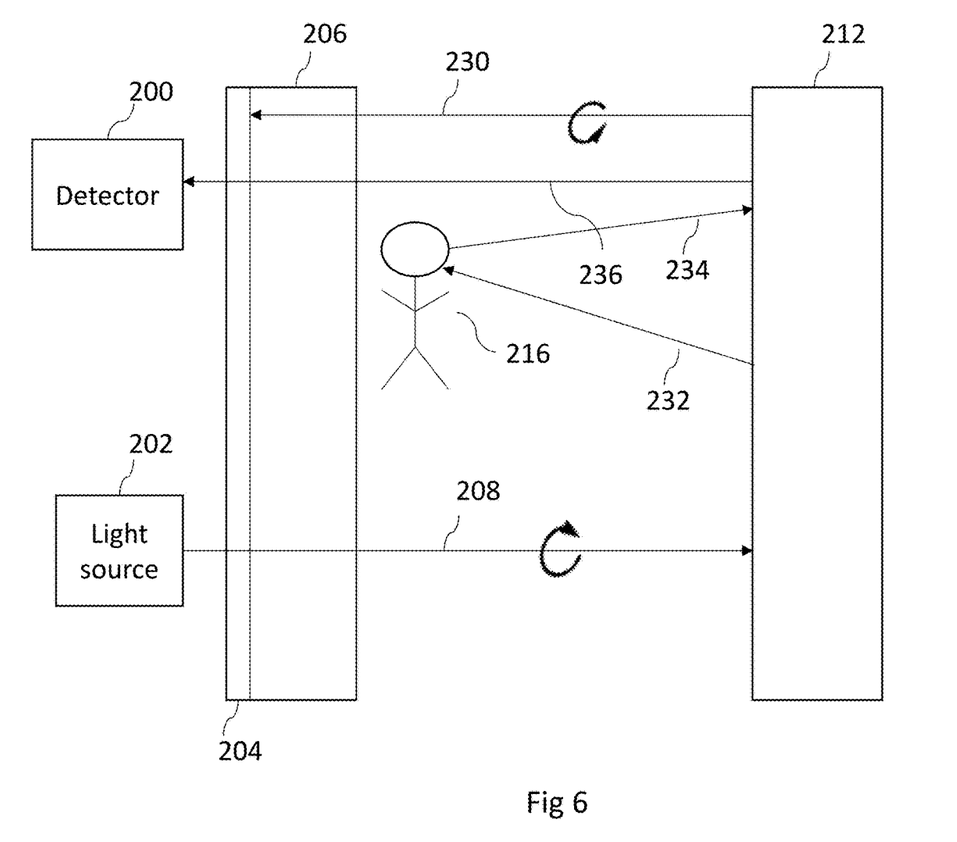
FIG. 6 shows a scenario where light is reflected from a mirror.

Reference is made to FIG. 6 in this example, and the reflective surface is a mirror. Light from the light source 202 passes through the linear polarizer 204 and the quarter wave plate 206. The light is thereby circularly polarized as previously discussed. The light which is reflected from the glass is referenced 230. As previously discussed, light which is reflected is circularly polarized but has a reversed polarized state as compared to the incident light. The reflected light 230 passes through the quarter wave plate 206 where it is converted to linearly polarized light and then blocked by the linear polarizer 204. Thus, the reflected light from the glass does not reach the detector 200.

Some of the light will reflect from the mirror 232 to reflect from an object 216 which is in front of the mirror. This could be used where a user is taking a picture of themselves. The light which is reflected from the object 234 will not be polarized and accordingly, when that unpolarized light is reflected from the object 234 back to the reflective surface 212, that light will in turn be reflected from the reflective surface back to the detector 236. As the light is not polarized, that light will reach the detector as previously discussed.

In some embodiments, the detector, light source, along with one or more of the linear polarizer and quarter wave plate may be included in a common package. In other embodiments, the one or more of the quarter wave plate 206 and linear polarizer may be provided externally to a package comprising the light source and detector.

By putting an anti-reflective polarizing filter within the module of the ToF sensor or in the optical stack within a cover glass on top of the sensor, the reflections from the for example mirror and glass can be filtered out, allowing the sensor to correctly range to the object of interest.

Thus, embodiments may use a linear polarizer in conjunction with a quarter wave plate ($\lambda/4$) to produce circularly polarized light. After the circularly polarized light is reflected by a mirror or glass it is unable to pass through the same optical stack.

During normal ranging operation with a ToF sensor with a normal Lambertian target, (see FIG. 3), the circularly polarized light travels from the light source and onto the object. The light is reflected back as unpolarized light and passes through the optical stack largely unimpeded. The ToF sensor can then measure the range to the object.

With a mirror target, (see FIG. 6), the circularly polarized light reflected from the mirror would still be circularly polarized but it would possess a reversed polarization state or spin characteristic. The reflected light the travels through the wave plate, and is converted to linearized polarized light. This linearly polarized light is orthogonal to the linear polarizer and hence would be rejected or blocked from reaching the sensor. The ToF sensor therefore would not see the mirror as a valid target.

For a glass use case (see FIG. 5), the glass would return polarized light and the object of interest would return unpolarized light and only the light from the object would be able to go through the optical stack.

In some embodiments, different polarizing arrangements may be used. For example the polarizer may be a wire grid polarizer, an absorptive polarizer, a beam splitting polarizer, a thin film polarizer or any other suitable polarization filter.

In some embodiments, the detector may comprise an array of sensing elements. At least one sensing element may have a polarizing arrangement such as discussed previously and at least one sensing element may not have a polarizing arrangement. With such an arrangement, the information obtained from the at least one sensing element provided with a polarizing arrangement may be compared with the information obtained from at least one sensing element without a polarizing arrangement. The difference may be used to detect the presence of a reflective object such as a pane of glass or a mirror. In particular if the range detected by the at least one sensing element without a polarizing arrangement is less than the range detected by the at least one sensing element with a polarizing arrangement, then it can be determined that there is a reflective surface present.

Figure 7:
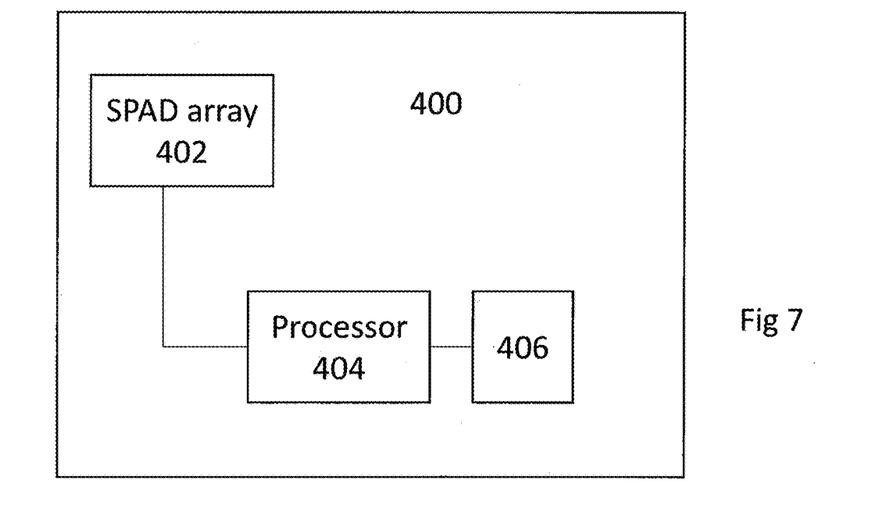
FIG. 7 shows a device with a SPAD array arrangement.

Some embodiments may be provided in a device 400 such as shown in FIG. 7. The device 400 may comprise a plurality of SPAD arrays as previously described and referenced 402. An output from the SPAD arrangement may be provided to a processor 404. Based on the output provided by the processor an information or control signal may be output to function block 406. The function block may be a controller which is configured to cause one or more actions in response to detecting a presence of an object. The function block may be a display which is configured to display a measurement result. The processor may be configured to identify one or more gestures from the information provided from the SPAD arrays.

In some embodiments the light source may produce the polarized light. For example the light source may produce circularly polarized light without utilizing a circular polarizer, such as a quarter wave-plate, in-front of the light source. In other embodiments the light source may, for example, produce linearly polarized light without utilizing a linear polarizer in-front of the light source.

In some embodiments the detector may detect polarized light. For example the detector may detect circularly polarized light without utilizing a circular polarizer, such as a quarter wave-plate, in-front of the detector. In other embodiments the detector may, for example, detect linearly polarized light without utilizing a linear polarizer in-front of the detector.

Figure 8:
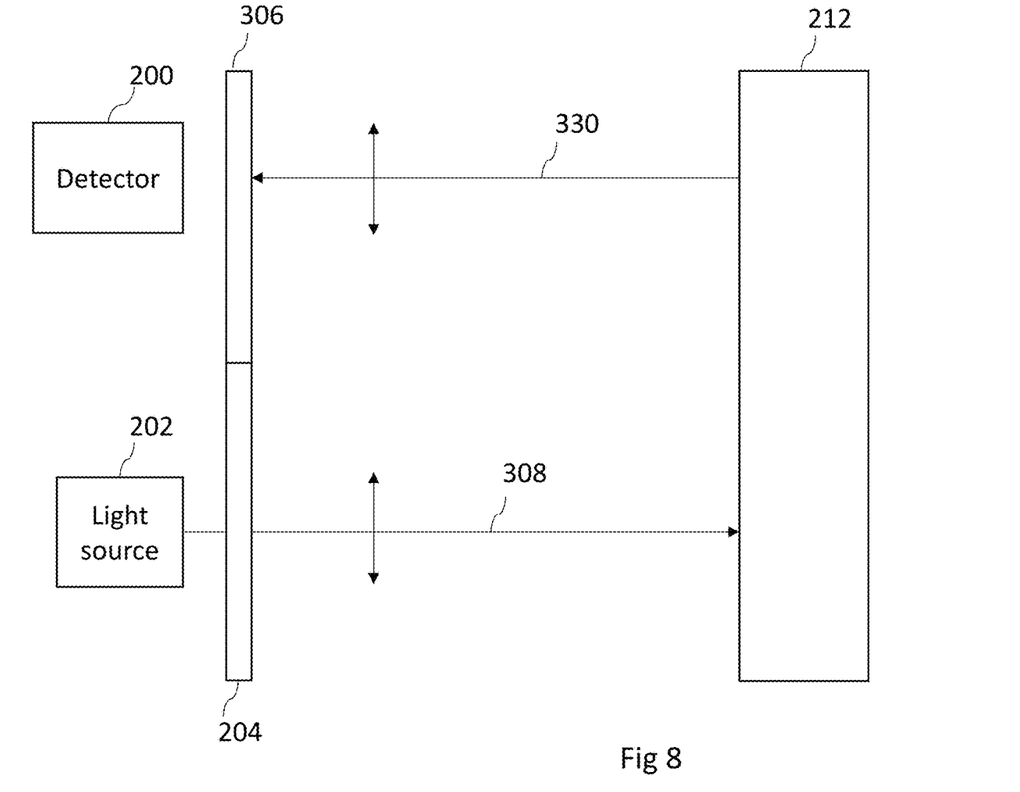
FIG. 8 shows a scenario where linearly polarized light is reflected from a mirror.

Reference is made to FIG. 8, in this example only linear polarizers, which are orthogonal to each other (90 degrees out of phase, or close to), are utilized. The first linear polarizer 204 (e.g. vertically aligned) will cause the unpolarized light emitted by the light source 202 to become linearly polarized light 308 (P-polarization in the example shown). When the P-polarized light is reflected by the reflective surface 212, the light retains its P-polarized state. The light which is reflected from the reflective surface is referenced 330. The reflected light 330 is then blocked by the second linear polarizer 306 which is orthogonally aligned to the first linear polarizer (e.g. horizontally aligned). Thus, the reflected light from the reflective surface does not reach the detector 200.

Figure 9:
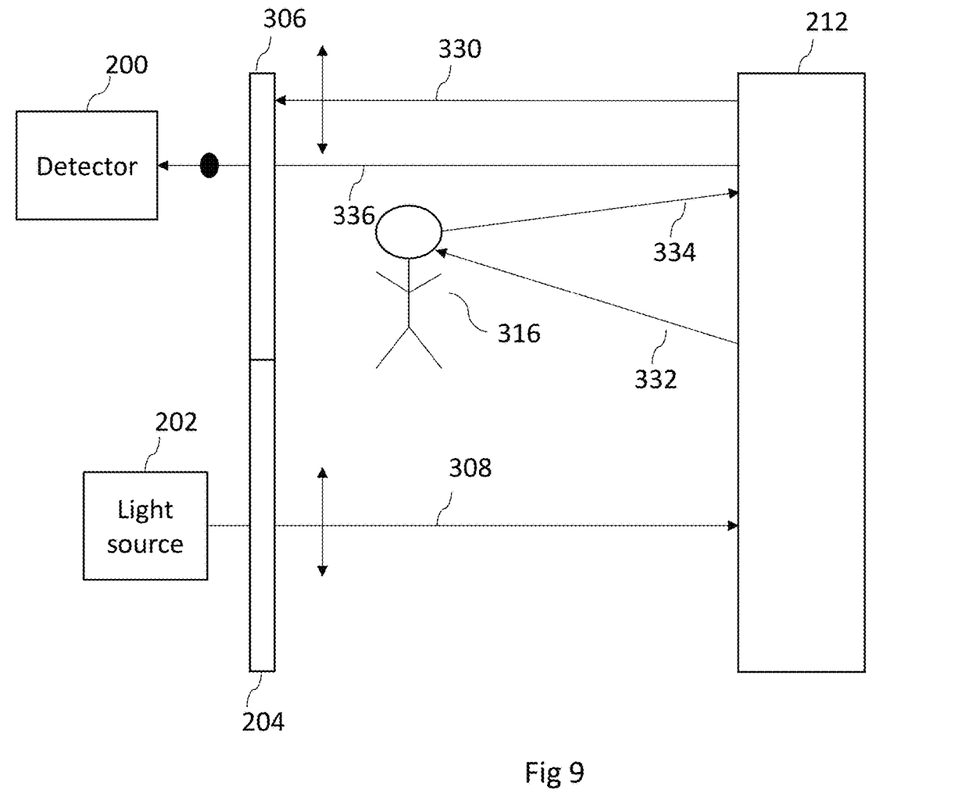
FIG. 9 shows a scenario where polarized light is reflected from an object via a mirror.

With a mirror target, (see FIG. 9), the P-polarized light reflected only from the mirror 330 would still be P-polarized, and would not be detected as discussed above. When the P-polarized light 332 is reflected by an object 316, the reflected light is not polarized 334. This unpolarized light 334 may then be reflected by the mirror 212. Some of the unpolarized light reflected from the mirror 336 is then able to pass through the second linear polarizer 306, as unpolarized light has some S-polarized components. Accordingly, the reflected light will reach the detector 200.

In some embodiments, the detector 200 may use single photon avalanche diodes (SPAD) to sense the reflected light. In general an array of SPADs are provided as a sensor in order to detect a reflected light pulse or light. A photon may trigger an avalanche current in one or more of the SPADs in an SPAD array. The avalanche current may signal an event, namely that a photon of light has been detected.

SPADs operate as follows. At an initial time, the diode is reverse-biased to a voltage larger than its breakdown voltage. The reception of a photon in the diode junction area starts an avalanche current in the diode, which creates an electric pulse. The diode is then biased back to a voltage smaller than the breakdown voltage to quench the avalanche current, so that the SPAD may again react to the reception of a photon. However, the diode must again be reverse-biased to a voltage larger than its breakdown voltage in order to react to another photon. SPADs can currently be used in cycles having reactivation periods shorter than 10 ns.

Figure 10A:
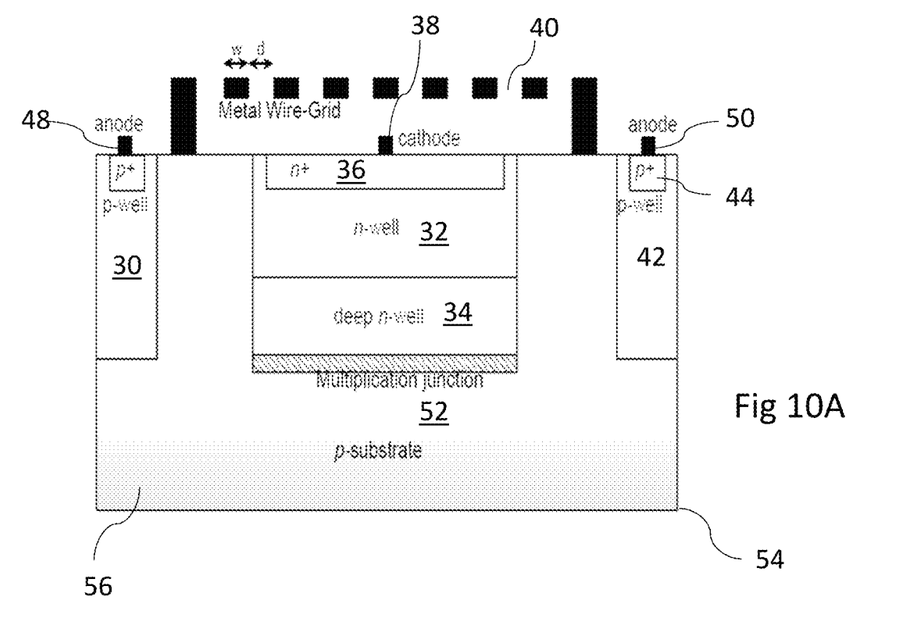
FIGS. 10A and 10B shows a cross section of SPAD devices used in some embodiments.

Reference is made to FIG. 10A which schematically shows a cross section of a SPAD used in some embodiments. The SPAD 54 may be provided in a p-substrate 52. Respective p wells 30 and 42 may be provided in the substrate. Between the two p-wells 30 and 42 is provided an n-well region. The n-well region comprises a deep n-well 34, an n-well 32 and an n+ region 36. The n+ region 36 is adjacent the surface region of the SPAD and has a cathode 38 in contact therewith. Each of the p-wells 30 and 42 is provided with a respective p+ region 46 and 44. A respective anode 48 and 50 is provided in contact with the respective p+ region 46 and 44. It should be appreciated that a multiplication junction is provided between the deep n-well 34 and the p-substrate 52.

A closely spaced metal wire grid 40 is provided over the surface of the SPAD and is thus between the SPAD detector and the source of the reflections. The wire grid has a plurality of parallel wires. The closely spaced wire grid acts as a polarization filter for light. The spacing d between the wires may be smaller than the wavelength of light and may for example be: $d=\lambda/2$ (where $\lambda$ is wavelength). The width w of the wire may be as small as the process allows: w=minimum (where w is the wire width, where the wire may for example be made of metal), the value of w may for example be 0.14 µm.

In some embodiments, a wire grid filter may be provided on each individual SPAD.

It should be appreciated that the orientation of the wires controls the direction of the linear polarization provided by the grid.

Figure 10B:
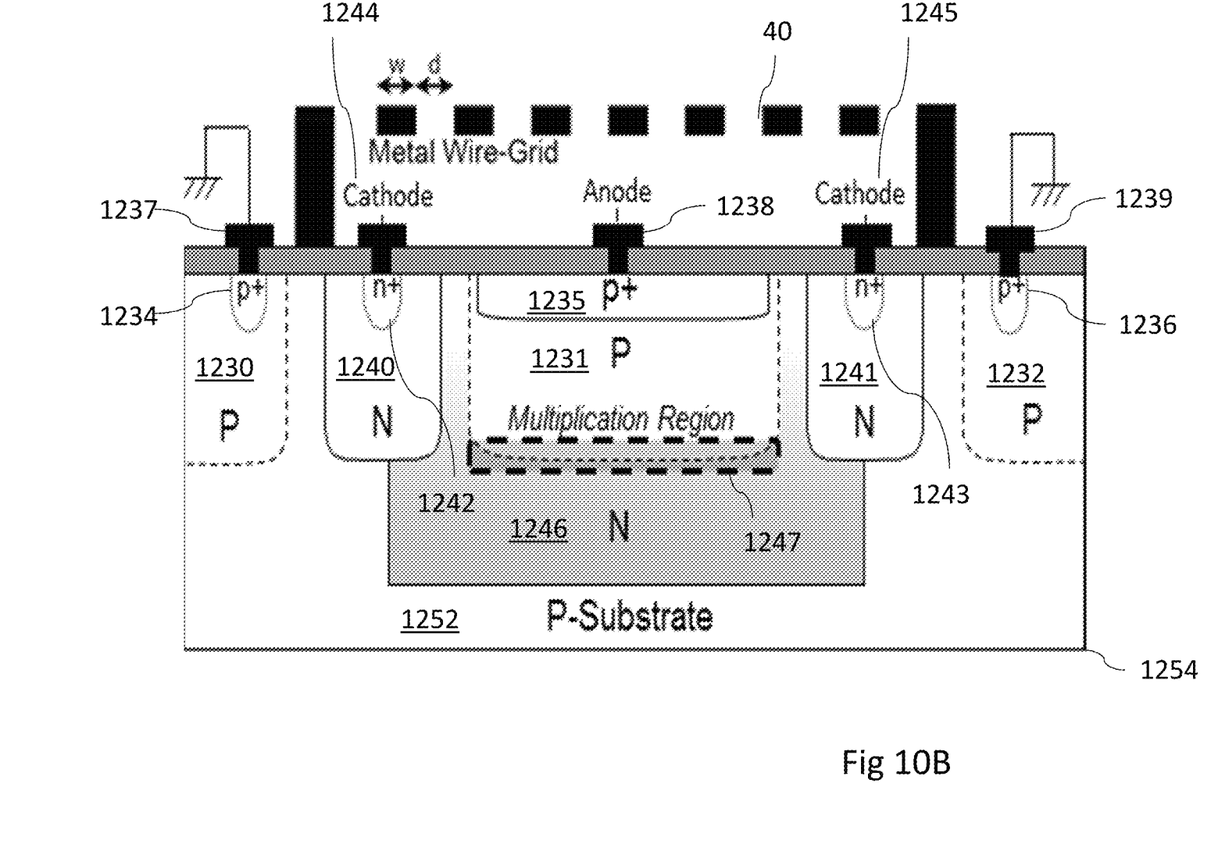

Reference is now made to FIG. 10B which schematically shows a cross section of a SPAD used in some embodiments. The SPAD 1254 may be provided in a P-substrate 1252. Respective P-wells 1230, 1231, and 1232 may be provided in the substrate. Each of the P-wells 1230, 1231, and 1232 comprise a p+ region 1234, 1235, and 1236. A respective anode 1238, is provided to the p+ region 1235. Each of the p+ regions 1234, and 1236, are provided with electrical grounding 1237, and 1239. The N well regions 1240, and 1241 are provided respectively between the P well regions 1230, and 1231 and between the P well regions 1231, and 1232 (i.e. in a P-N-P-N-P arrangement). Each of the N-wells 1240, and 1241, comprise an n+ region 1242, and 1243, respectively. The N wells 1240, and 1241 are provided with cathodes 1244, and 1245 respectively. The N-P-N wells 1240, 1231, and 1241, respectively, are provided with a deep N-well 1246. A multiplication junction 1247 is provided between the deep N-well 1246, and P well 1231. In some embodiments the linear polarizer grid edges 40 should contact from top metal down to Poly, to avoid side illumination.

Figure 11:
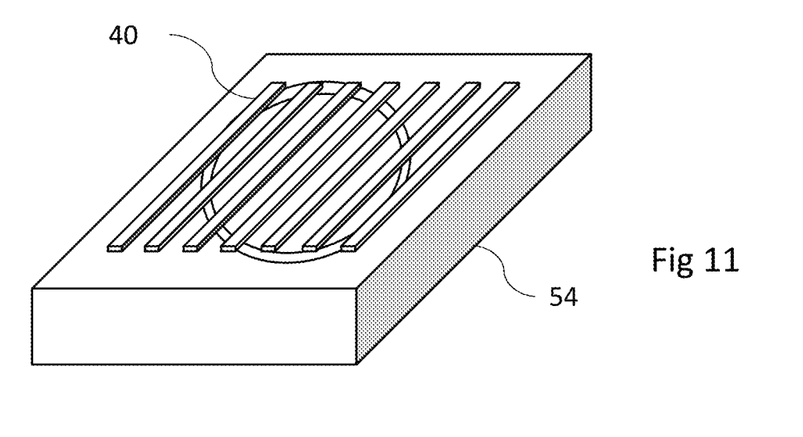
FIG. 11 shows a perspective view of the SPAD device of FIGS. 10A-10B.

In this regard, reference is made to FIG. 11 which schematically shows the grid 40 provided on the SPAD 54. In some embodiments, it is ensured that the grid end edges, in the longitudinal direction parallel to the wires, should contact from the top metal down to the poly layer to avoid side illumination impinging on the SPAD, thus bypassing the polarization function provided by the grid. The edges which are perpendicular to the longitudinal direction of the wires do still provide a polarization function. However, in some embodiments, the grid end edges in the parallel direction to the wires may be such that there is a continuous side edge to prevent any side illumination.

Figure 12:
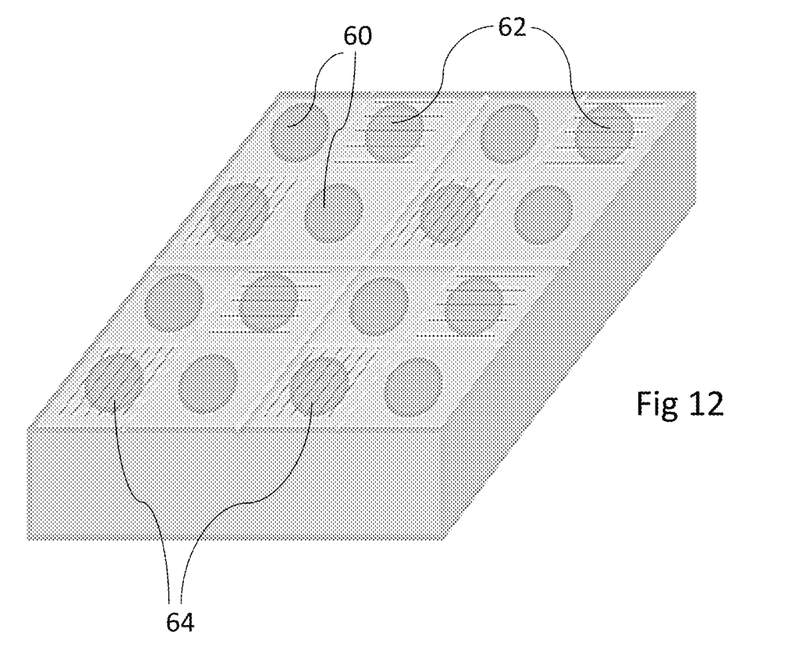
FIG. 12 shows schematically an example of an imager with linear polarization filtering.

Reference is now made to FIG. 12 which schematically shows an arrangement of filters on the SPAD array. In this example, some of the SPADs 60 are without any wire grid and are thus able to detect all light including polarized light. In other words, these SPADs do not have any filter on them. Some of the SPADs 62 are each provided with a wire grid which is oriented in one direction and some of the SPADs 64 are provided with wire grids which are oriented in a direction perpendicular to that of SPADs 62. In the example shown in FIG. 12 those SPADs referenced 62 may for example only detect vertically polarized light whereas as those which are referenced 64 are able to detect only horizontally polarized light.

With the a SPAD array such as described in relation to FIGS. 10a, 10b, 11 and 12, the light source may be provided with its own linearly polarizing filter to ensure that linearly polarized light is emitted. The polarization of the light from the light source is at right angles with respect to the polarization filter on at least one SPAD to filter out light from unwanted reflections (for example in the window and mirror scenarios discussed previously.)

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating elements generating events on reception of the light information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. A distance sensing apparatus, comprising:
   a light source configured to emit polarized light directed towards both a target object and highly reflective glass or mirror surface; and
   a light sensitive detector comprising an array of light sensors, at least one light sensor of said array not including a polarizing filter in order to detect unpolarized light reflected from said target object, and at least one other light sensor of said array including a polarizing filter in order to detect polarized light reflected from the highly reflective glass or mirror surface; and
   means for processing the detected unpolarized light reflected from said target object and the detected polarized light reflected from the highly reflective glass or mirror surface in order to determine a distance to the target object and further detect the presence of the highly reflective glass or mirror surface due to a difference in information output by said at least one light sensor of said array not including the polarizing filter and said at least other light sensor of said array including the polarizing filter.

2. The apparatus as claimed in claim 1, wherein said light source comprises an emitter of polarized light.

3. The apparatus as claimed in claim 1, wherein said light source comprises a light source polarizer.

4. The apparatus as claimed in claim 3, wherein said light source polarizer is configured to function for one of: circularly polarizing light emitted by said light source; and linearly polarizing light emitted by said light source.

5. The apparatus as claimed in claim 3, wherein said light source polarizer comprises a quarter wave plate.

6. The apparatus as claimed in claim 3, wherein said light source polarizer comprises a linear polarizer.

7. The apparatus as claimed in claim 1, wherein said array further comprises a further light sensor including a further polarizing filter, and wherein said polarizing filter comprises at least one first linear polarizer and wherein said further polarizing filter comprises at least one second linear polarizer, wherein the second linear polarizer is oriented substantially orthogonal to the at least one first linear polarizer.

8. The apparatus as claimed in claim 1, wherein said polarizing filter comprises a linear grid.

9. The apparatus as claimed in claim 8, wherein said linear grid comprises a grid of parallel wires, a longitudinal extent of said parallel wires defining a plane of polarization.

10. The apparatus as claimed in claim 9, wherein a spacing between adjacent wires of said grid of parallel wires is less than a wavelength of the emitted polarized light.

11. The apparatus as claimed in claim 1, wherein each light sensor of said array comprises a SPAD.

\* \* \* \* \*